(12) United States Patent
Christodorescu et al.

(10) Patent No.: US 9,600,663 B2
(45) Date of Patent: *Mar. 21, 2017

(54) SYSTEM AND METHOD FOR PROTECTION FROM BUFFER OVERFLOW VULNERABILITY DUE TO PLACEMENT NEW CONSTRUCTS IN C++

(71) Applicant: International Business Machines Corporation, Armonk, NY (US)

(72) Inventors: Mihai Christodorescu, Briarcliff Manor, NY (US); Ashish Kundu, Elmsford, NY (US); Ajay Mohindra, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/686,346

(22) Filed: Apr. 14, 2015

(65) Prior Publication Data

US 2015/0220731 A1 Aug. 6, 2015

Related U.S. Application Data

(63) Continuation of application No. 13/766,313, filed on Feb. 13, 2013, now Pat. No. 9,069,970, which is a
(Continued)

(51) Int. Cl.
*G06F 21/52* (2013.01)
*G06F 21/57* (2013.01)
(Continued)

(52) U.S. Cl.
CPC ............ *G06F 21/54* (2013.01); *G06F 12/023* (2013.01); *G06F 21/126* (2013.01); *G06F 21/52* (2013.01);
(Continued)

(58) Field of Classification Search
CPC ................................ G06F 21/52; G06F 21/57
See application file for complete search history.

(56) References Cited

U.S. PATENT DOCUMENTS 6,112,268 A 8/2000 Ohashi et al.
6,578,094 B1 6/2003 Moudgill
(Continued)

OTHER PUBLICATIONS

Kundu et al., "A New Class of Buffer Overflow Attacks," International Conference on Distributed Computing Systems (ICDCS), Jun. 2011, pp. 730-739.*

(Continued)

*Primary Examiner* — Jason C Chiang
(74) *Attorney, Agent, or Firm* — Louis J. Percello; Ryan, Mason & Lewis, LLP (57) ABSTRACT

Systems and methods for protection from buffer overflow vulnerability due to placement new constructs in C++ are provided. A system for protecting from buffer overflow vulnerability due to placement new constructs, comprises a compiler which is capable of receiving a program including a placement new instruction, and runtime which is capable of receiving binary code from the compiler and determining whether the program includes the placement new instruction and whether the placement new instruction would lead to buffer overflow, wherein the runtime is linked to a library including methods for preventing the buffer overflow, and selects a method for preventing the buffer overflow if the runtime determines that the placement new instruction would lead to the buffer overflow.

19 Claims, 7 Drawing Sheets

Related U.S. Application Data continuation of application No. 13/723,570, filed on Dec. 21, 2012, now Pat. No. 9,081,966.

(51) Int. Cl.
*G06F 21/54* (2013.01)
*G06F 12/02* (2006.01)
*G06F 21/12* (2013.01)
*G06F 21/56* (2013.01)

(52) U.S. Cl.
CPC ............ *G06F 21/566* (2013.01); *G06F 21/57* (2013.01); *G06F 21/577* (2013.01); *G06F 2221/031* (2013.01); *G06F 2221/032* (2013.01); *G06F 2221/0735* (2013.01)

(56) References Cited

U.S. PATENT DOCUMENTS

| | | | |
|---|---|---|---|
| 6,594,749 B1 * | 7/2003 | Czajkowski | G06F 12/023 707/999.202 |
| 6,832,302 B1 * | 12/2004 | Fetzer | G06F 21/52 711/154 |
| 7,000,087 B2 * | 2/2006 | Atherton | G06F 12/08 711/170 |
| 7,284,274 B1 | 10/2007 | Walls et al. | |
| 7,581,089 B1 | 8/2009 | White | |
| 7,631,249 B2 | 12/2009 | Borde et al. | |
| 7,856,538 B2 | 12/2010 | Speirs, II et al. | |
| 7,879,661 B2 | 2/2011 | Tsuzumitani | |
| 7,979,661 B2 * | 7/2011 | Dickenson | G06F 11/0715 711/170 |
| 8,156,483 B2 | 4/2012 | Berg et al. | |
| 8,239,836 B1 * | 8/2012 | Franz | G06F 11/1487 717/127 |
| 8,347,387 B1 * | 1/2013 | Rogson | G06F 12/1441 726/22 |
| 8,402,541 B2 | 3/2013 | Craioveanu et al. | |
| 8,429,545 B2 * | 4/2013 | Dixon | G06Q 10/06 707/706 |
| 2004/0103252 A1 * | 5/2004 | Lee | G06F 12/1441 711/132 |
| 2004/0177263 A1 | 9/2004 | Sobel et al. | |
| 2004/0250105 A1 * | 12/2004 | Molnar | G06F 9/5016 726/23 |
| 2005/0283770 A1 * | 12/2005 | Karp | G06F 11/366 717/151 |
| 2006/0259981 A1 * | 11/2006 | Ben-Shoshan | G06F 21/126 726/27 |
| 2007/0006314 A1 | 1/2007 | Costa et al. | |
| 2007/0016685 A1 | 1/2007 | Crume | |
| 2008/0060077 A1 | 3/2008 | Cowan et al. | |
| 2009/0249289 A1 * | 10/2009 | Akritidis | G06F 11/3612 717/108 |
| 2011/0197253 A1 * | 8/2011 | Tas | G06F 21/57 726/1 |
| 2011/0277035 A1 * | 11/2011 | Singh | G06F 21/52 726/25 |

OTHER PUBLICATIONS

A. Kundu et al., "A New Class of Buffer Overflow Attacks," 31st International Conference on Distributed Computing Systems (ICDCS), Jun. 2011, pp. 730-739.

* cited by examiner

SYSTEM AND METHOD FOR PROTECTION FROM BUFFER OVERFLOW VULNERABILITY DUE TO PLACEMENT NEW CONSTRUCTS IN C++

CROSS-REFERENCE TO RELATED APPLICATION

This application is a Continuation of U.S. patent application Ser. No. 13/766,313, filed on Feb. 13, 2013, which is a Continuation of U.S. patent application Ser. No. 13/723,570, filed on Dec. 21, 2012, the disclosures of which are each incorporated herein by reference in their entireties.

TECHNICAL FIELD

The field generally relates to systems and methods for protection from buffer overflow vulnerability and, in particular, systems and methods for protection from buffer overflow vulnerability due to placement new constructs in C++.

BACKGROUND

Buffer overflows occur when n bytes are written into a memory area (buffer) having a size less than n bytes. If an attacker, for example, one seeking to inflict a virus or a worm, gains direct or indirect control of what is written into this memory area, the attacker can carry out buffer overflow attack(s).

Buffer overflows have been one of the most widely exploited vulnerabilities, and can be due to "unchecked buffers" where there is a lack of adequate bounds checking when copying strings and arrays, and can also be caused by exploiting format string vulnerabilities.

Buffer overflow attacks can also be carried out by exploiting the placement new expression supported by C++. A purpose of the placement new expression is to "place", i.e., to allocate a dynamically created object or array at a given address that refers to a memory arena that has already been allocated to the process. The use of placement new allows a program to make use of memory pools without allocating memory dynamically, permits avoidance of memory allocation exceptions, and allows for building of custom garbage collectors and debuggers.

However, placement new, if not appropriately used in programs may lead to security threats. For example, security threats can occur if the size of new object being placed is larger than the memory already allocated, alignment issues are not appropriately handled, and de-allocation of the memory is not carried out appropriately.

Objects are being used as units of communication between programs. For example, web services, cloud-based services, and object-based interactions between browsers and servers employ object-based information transfer paradigms. Since objects may be passed to a program from tainted/untrusted remote or local sources, object-based buffer overflows have become a concern. Programs may also make logic errors by placing an object in a buffer that has a size smaller than the size of the object.

Like conventional buffer overflow attacks, placement new-based buffer overflow attacks can also occur due to insufficient and/or inaccurate bounds checking. Unlike conventional buffer overflow attacks, placement new-based attacks can lead to both object and array overflows. Existing tools do not detect nor address buffer overflow vulnerabilities resulting from the use of the "placement new" expression in C++, and a tool is needed for analysis of code and for detecting vulnerabilities due to placement new, and automatically addressing these vulnerabilities.

SUMMARY

In general, exemplary embodiments of the invention include systems and methods for protection from buffer overflow vulnerability and, in particular, systems and methods for protection from buffer overflow vulnerability due to placement new constructs in C++.

According to an exemplary embodiment of the present invention, a system for protecting from buffer overflow vulnerability due to placement new constructs, comprises a compiler which is capable of receiving a program including a placement new instruction, and runtime which is capable of receiving binary code from the compiler and determining whether the program includes the placement new instruction and whether the placement new instruction would lead to buffer overflow, wherein the runtime is linked to a library including methods for preventing the buffer overflow, and selects a method for preventing the buffer overflow if the runtime determines that the placement new instruction would lead to the buffer overflow.

The runtime may determine that the placement new instruction seeks to place an object in a memory area where the object will overwrite contents in the memory area. The runtime may compare a size of the object with a size of a portion of the memory area allocated to the object.

The system may further comprise an address-rewriting module linked to the library, wherein the address-rewriting module rewrites a memory address for the object so that the object will not overwrite the contents in the memory area. The address-rewriting module may alter at least one of how and where an object is to be stored.

The address-rewriting module may allocate portions of the object to respective memory regions, wherein the respective memory regions are in different systems, and wherein the respective memory regions are linked to each other.

The address-rewriting module may allocate the object to a memory location other than a memory location allocated by the placement new instruction and that is large enough to accommodate the entire object.

The library may receive predetermined policies on which to base the selection of the method for preventing the buffer overflow.

The runtime may one of terminate the program or perform exception handling. The runtime may place less than an entire object at a memory address allocated by the placement new instruction.

According to an exemplary embodiment of the present invention, a method for protecting from buffer overflow vulnerability due to placement new constructs, comprises detecting whether there is an instruction in a program which would lead to buffer overflow, checking whether the instruction is a placement new instruction which would result in an object overwriting contents in a memory area, and selecting a method for preventing the buffer overflow if the instruction is the placement new instruction which would result in the object overwriting the contents in the memory area.

Checking may comprise determining whether a size of the object taken from a memory address allocated by the placement new instruction goes beyond a point in the memory area where the contents are located.

The selected method may allocate portions of the object to respective memory regions, allocate the object to a memory location other than a memory location allocated by the placement new instruction and that is large enough to accommodate the entire object, one of terminates the program or perform exception handling, or place less than the entire object at a memory address allocated by the placement new instruction.

The method may further comprise creating a data form including starting addresses of the contents in the memory area, and given an address X where the object is to be placed and a size S of the object created by the placement new instruction, returning all of the starting addresses in the data form that lie in the range of X and X+S.

The method may further comprise one of terminating the program or performing exception handling if the return list is not empty.

The method may further comprise, if the return list is not empty, populating a portion of the memory area allocated by the placement new instruction with less than the total object, and populating a remaining space of the memory area with a handler routine.

The method may further comprise, if the return list is not empty, allocating respective portions of the object to free memory of unused memory spaces, wherein the object is divided and the respective portions are placed in a plurality of blocks of the free memory, wherein the blocks of free memory are linked together.

The method may further comprise, if the return list is not empty, allocating the object to a new memory location other than an original memory location allocated by the placement new instruction and that is large enough to accommodate the entire object, and storing a correspondence between the original and the new memory locations.

According to an embodiment of the present invention, a method for protecting from buffer overflow vulnerability due to placement new constructs, comprises determining whether an instruction in a program is a placement new instruction which would result in an overflow into memory regions and overwrite contents in memory that are expected not to be overwritten in a correct program, and carrying out a policy to be instituted if it is determined that the instruction is the placement new instruction which would result in the overflow.

The policy may be based on at least one of a type of the program, a purpose of the program, a nature of the overflow, a timeframe and where the program is run.

The policy may be based on at least one of security, availability of memory, and a requirement to use already allocated memory.

The policy may require termination of the program or performing exception handling.

The policy may require placing less than the entire object at a memory address allocated by the placement new instruction.

The policy may require that no action or that action be taken to prevent the overwriting.

The policy may be supplied during runtime and be independent of the program.

The policy may be supplied with the program, as part of the program.

According to an embodiment of the present invention, an article of manufacture comprises a computer readable storage medium comprising program code tangibly embodied thereon, which when executed by a computer, performs method steps for protecting from buffer overflow vulnerability due to placement new constructs, the method steps comprising determining whether an instruction in a program is a placement new instruction which would result in an object overwriting contents in a memory area, and selecting a method for preventing buffer overflow if it is determined that the instruction is the placement new instruction which would result in the object overwriting the contents in the memory area.

According to an embodiment of the present invention, an apparatus for protecting from buffer overflow vulnerability due to placement new constructs, comprises a memory, and a processor coupled to the memory and configured to execute code stored in the memory for determining whether an instruction in a program is a placement new instruction which would result in an object overwriting contents in a memory area, wherein a size of the object is measured from a memory address allocated by the placement new instruction to determine if the object extends into a portion of the memory area where the contents are located, and selecting a method for preventing buffer overflow if it is determined that the instruction is the placement new instruction which would result in the object overwriting the contents in the memory area.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Exemplary embodiments of the invention will now be discussed in further detail with regard to systems and methods for protection from buffer overflow vulnerability and, in particular, systems and methods for protection from buffer overflow vulnerability due to placement new constructs in C++. This invention may, however, be embodied in many different forms and should not be construed as limited to the embodiments set forth herein.

Buffer overflow attacks can be carried out by overflowing objects by using placement new. Object overflows may occur because of received objects and/or construction of new objects. A memory arena allocated to an object may not be of enough size to hold an object that is newly constructed or that is received and placed at this memory arena using "placement new". Further, an attacker can supply values of member variables of an object such that the overflown memory locations can hold values that are meaningful to a specific attack.

Embodiments of the present invention provide measures that can be adopted for preventing placement new vulnerabilities.

Placement new facilitates the placement of objects at a memory arena that is pre-allocated for an object or an array. Since the state and size of such objects can be influenced by attackers, object overflow may occur. For example, placement new allows an attacker to place a larger object in the memory allocated to a smaller object, leading to object overflow, and causing overwriting of certain memory locations.

Some features of placement new that can lead to security issues are: (1) placement new allowing any address allocated to a process to be used to place an object; (2) placement new not enforcing bounds checking (e.g., compile-time or run-time enforcement of bounds checking may not be applied); and (3) invocation of placement new not carrying out any type-checking (e.g., if memory is allocated to an instance of type T1, then placing an instance of type T2 at that memory succeeds even if T2 is not a compatible type of T1).

Placement of a larger object in the memory allocated to a smaller object may occur when a program constructs a larger object in the place of a smaller object, but does not carry out bounds checking on sizes and/or when a program accepts an object from another program (local or remote) or from network, and places the object in the place of other object. In both cases, the smaller object may be an instance of a supertype and the larger object may be an instance of a subtype. Depending on the situation, a programmer may ignore checking the sizes before placement, providing an opening for an attacker or a malicious program to cause an attack on the receiving program. For example, a programmer may not include any code to check the size objects to be placed in memory because of trusting the protocol through which objects are received and sent from one program to another.

Object overflows can be, for example, external and internal. In an external overflow, an object overflow overwrites contents in memory locations that are external to that object. In an internal overflow, an object overflow overwrites contents in memory locations that are internal to that object. Internal overflows have the capability to modify internal states of an object.

Objects can be overwritten via object overflow. By overwriting objects partially or fully, member variables as well as virtual table pointers can be overwritten.

In addition to object overflow, the embodiments of the present invention may also be applied to prevent array overflow, where, for example, a local variable is used to allocate memory, and can be used to carry out a stack overflow. Overflow of array-type buffers, such as strings, may be exploited by attackers. Using placement new, an attacker can cause array overflow by modifying the variable that stores the size of the buffer to a value larger than the memory pool size by overflowing an object.

According to embodiments of the present invention, software under development that has not been deployed, software which has been deployed but for which it is possible to modify the source and generate a new image for deployment (referred to as modifiable software), and software for which the source code is not available and even if modifiable cannot be re-deployed (referred to as legacy software) can be protected from placement new buffer overflow vulnerabilities.

According to embodiments of the present invention, correct coding can be used to address placement new vulnerabilities. As previously discussed, object overflow may be a primary mode of overflow via placement new. According to embodiments of the present invention, in order to prevent object overflow, the sizes of instances are checked. For example, according to an embodiment, at each point where placement new is used, it is enforced that the size of the new object or array B being placed in a memory arena of another object/array A is not larger than the object or array A. If the size checking fails, then the memory allocated to A is freed, and a non-placement new expression is used to create B. According to embodiments of the present invention, in order to determine the size of objects, a "sizeof( )" operation can be used.

Figure 1:
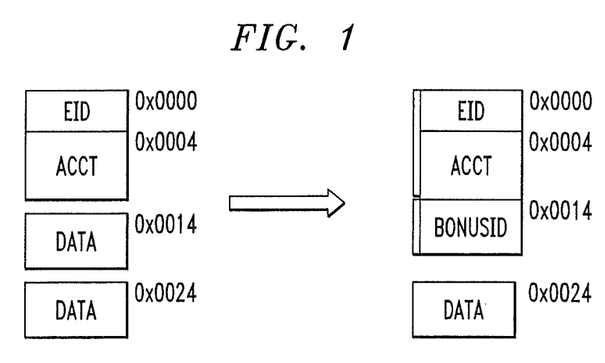
FIG. 1 is a block diagram depicting a scenario where buffer overflow vulnerabilities remain unchecked.

Referring to FIG. 1, which is a block diagram depicting a scenario where buffer overflow vulnerabilities remain unchecked, assuming that the address specified for the placement new construct is 64, and the instance of the employee object, including employee identification (eid) and account (acct), is 14 bytes. If, by placement new, an attacker includes with the employee object additional information (bonusid) to increase the size of the employee object to 24 bytes, that would lead to buffer overflow, causing a data portion in the memory arena (Data) after the 14 bytes to be overwritten. Accordingly, if the address is 64, the 10 bytes after 78 (64+14) are overwritten. C++ does not have a mechanism to check such an overflow. According to embodiments of the present invention, the data in the memory arena refers to contents in the memory, which can be, for example, data and/or instructions.

Figure 2:
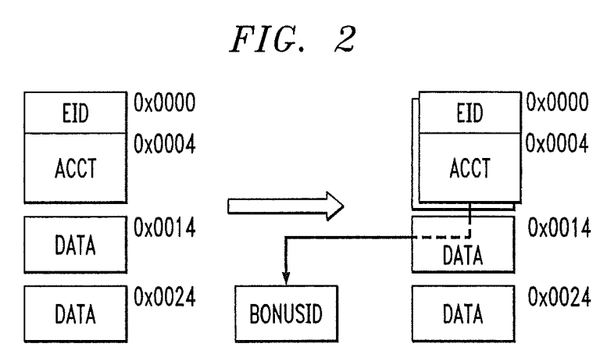
FIG. 2 is a block diagram depicting a scenario where buffer overflow vulnerabilities are checked in accordance with embodiments of the present invention.

Referring to FIG. 2, which is a block diagram depicting a scenario where buffer overflow vulnerabilities are checked in accordance with embodiments of the present invention, the bonusid does not overwrite the "Data" after the 14 bytes, and, instead, depending on the situation and the method used, is not written to any memory area, or is reallocated to one or more different memory locations.

Figure 3:
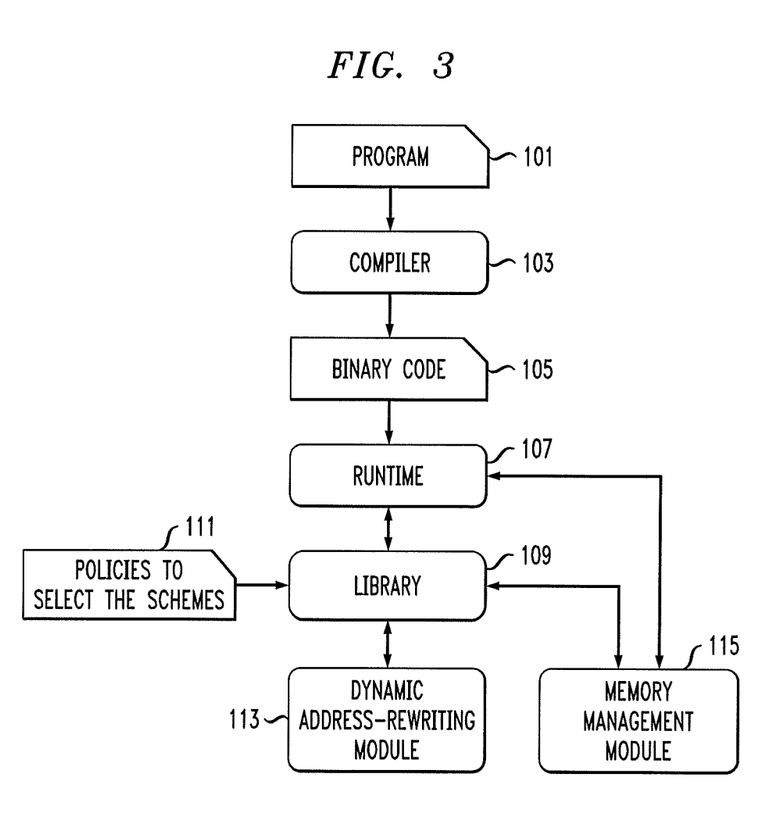
FIG. 3 is a high-level diagram of a system and method for protecting from buffer overflow vulnerability due to placement new constructs in C++ according to an exemplary embodiment of the invention.

Referring to FIG. 3, which is a high-level diagram of a system and method for protecting from buffer overflow vulnerability due to placement new constructs in C++, according to an exemplary embodiment of the invention, a program 101 contains a placement new construct, which is sent to a compiler 103. The compiler 103 generates the binary code 105, which is sent to the runtime 107, which is the software or operating system designed to support the execution of the program 101. The runtime 107 is linked to a library 109, which includes methods or schemes for preventing buffer overflow, according to exemplary embodiments of the invention. The determination of which of the methods or schemes for preventing buffer overflow to use is based, at least in part, on predetermined policies governing the selection of schemes 111, which are received by the library 109. The library 109 interacts with the dynamic address-rewriting module 113. As will be described further below, the address-rewriting module 113 changes the way an object is stored. For example, the memory address is rewritten by the address-rewriting module 113 so that data is not overwritten. Referring back to FIG. 2, the address-rewriting module 113 will rewrite the memory address so that bonusid does not appear at 0014, and Data is not overwritten by bonusid. The system further includes a memory management module 115, which is linked to the library 109 and runtime 107.

Figure 4:
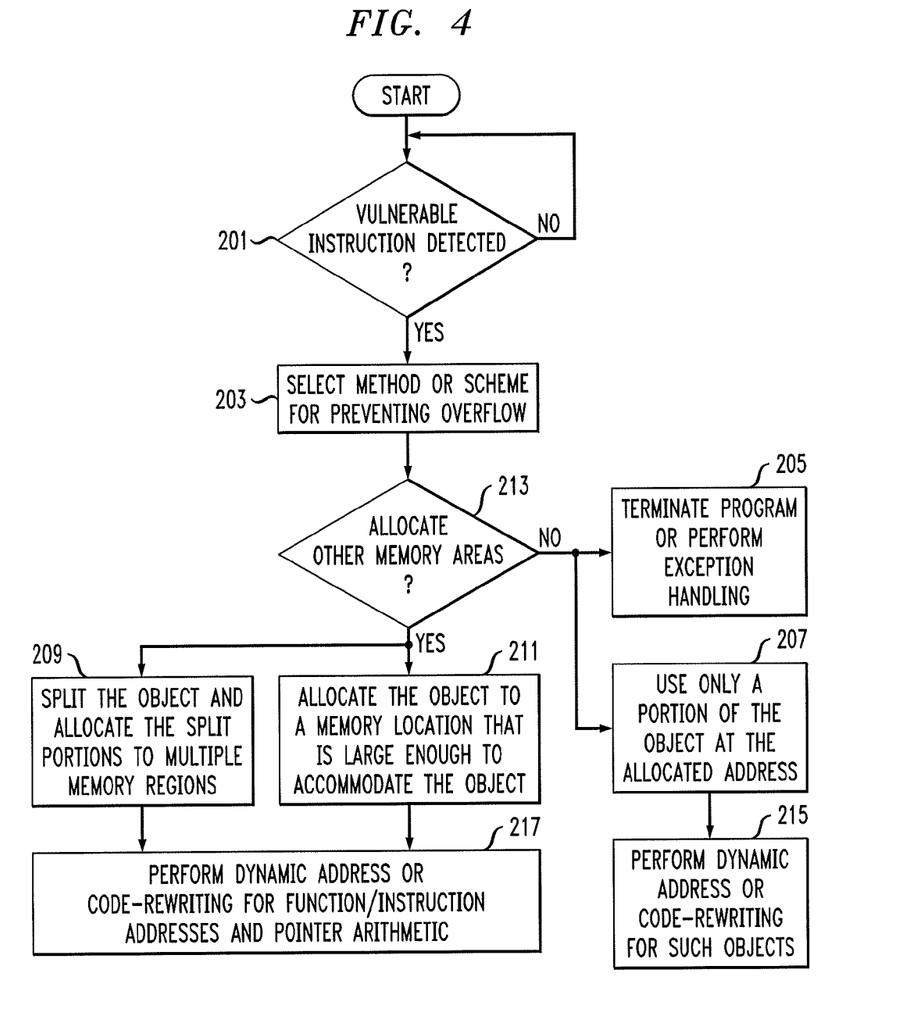
FIG. 4 is a flow diagram of a method for protecting from buffer overflow vulnerability due to placement new constructs in C++ according to an exemplary embodiment of the invention.

Referring to FIG. 4, a method for protecting from buffer overflow vulnerability due to placement new constructs in C++ is shown, according to an exemplary embodiment of the invention. At a step 201 of the method, the runtime 107 detects whether there is an instruction in a program which would lead to buffer overflow. For example, using input from the library 109, which can check whether an instruction is a placement new instruction, the runtime 107 detects a placement new construct which seeks to place a new object that is larger than a former object in a designated memory area at a particular address, and would result in overwriting of data. Accordingly, the runtime 107 determines where the program wants to place an object and the size of the object, and compares the size of the object with the size of the allocated memory. For example, if 64 is the memory address, x is the size of the object, and y is the point where the next object starts (e.g., 78 (using size 0014 from FIG. 2)), then there is no buffer overflow problem if $64+x \leq y$. However, there is a buffer overflow situation if $64+x > y$. As stated above, the runtime 107 may use a "sizeof( )" operation in order to determine the size of objects.

If at step 201 a vulnerable instruction is detected, the method or scheme for preventing buffer overflow to be used is selected at step 203. As stated above, the determination of which of the methods or schemes for preventing buffer overflow to use is based, at least in part, on predetermined policies governing the selection of schemes 111, which are received by the library 109. For example, depending on certain circumstances, the policies may relate to the type of program, the purpose of the program, the security risks, the nature of the overflow, where the program is run, availability of memory, requirements for using already allocated memory, timeframe, etc., and a method or scheme for preventing buffer overflow may terminate a program upon detection of an overflow or perform exception handling (block 205), use only a portion of the object at the allocated address (e.g., when a given execution does not reach all parts of an object) (block 207), split the object and allocate the split portions to memory at different locations within the system or across multiple systems and link the split portions (block 209), or allocating the object to a memory location that is large enough to accommodate the object without splitting the object (block 211). According to an embodiment, a policy may require any one of the methods in blocks 205, 207, 209 or 211, or require that no action be taken to prevent the overflow. According to an embodiment, the policy may be supplied during runtime and be independent of the program, or may be part of the program.

With respect to block 209, a single memory area by itself is not large enough to accommodate the object, but more than one memory area linked with each other provides sufficient storage space for the object. The multiple memory areas include the split portions of the object, and are linked to each other. The link can be between memory areas within the same system, or between memory areas in different systems. Links between memory areas in different systems may be used, for example, in a cloud based application. With respect to block 211, unlike block 209, the allocated memory area is contiguous and large enough to accommodate an entire object. According to an embodiment, there is a link between the original allocated memory area and the new contiguous memory area (e.g., between address 64 and a new address 128).

Block 213 represents a decision whether to allocate other memory areas (e.g., other than the original memory address of the object), leading to schemes at blocks 209 and 211 given an affirmative response, and to schemes at blocks 205 and 207 for a negative response.

At block 215, when the method or scheme at block 207 is selected, dynamic address or code-rewriting is performed for such objects. At block 217, when the methods or schemes at blocks 209 or 211 are selected, dynamic address or code-rewriting is performed for function/instruction addresses and pointer arithmetic. Objects are accessed via several code segments. Consider the following example: x=obj.i+obj.j. In this example, x is the output of the addition of two members i and j of object obj. The binary code refers to i and j by the logical or physical addresses where they are stored as part of the object in the memory. When an object is stored in memory with none of the methods in the embodiments of the invention applied, consider the addresses to be x0F000100 and x0F000104. The expression would use these addresses as part of the hardware instructions. When the embodiments of the invention are applied to the objects, consider the addresses to be x0F000100 and x0FF00108. This different addressing would require the above expression to be changed appropriately as and when the addresses have been changed for j, so that the computing system refers to x0FF00108 for j instead of x0F000104.

According to an embodiment of the present invention, address and code-rewriting is carried out dynamically to address this requirement, and a method for address and code-rewriting determines the new and old (that are used in the code under execution) addresses of the affected members of objects, and replaces the old address with the new address. According to an embodiment, the new address may not be in the form of a constant, but an expression that evaluates to an address via pointer arithmetic in C++.

Figure 5:
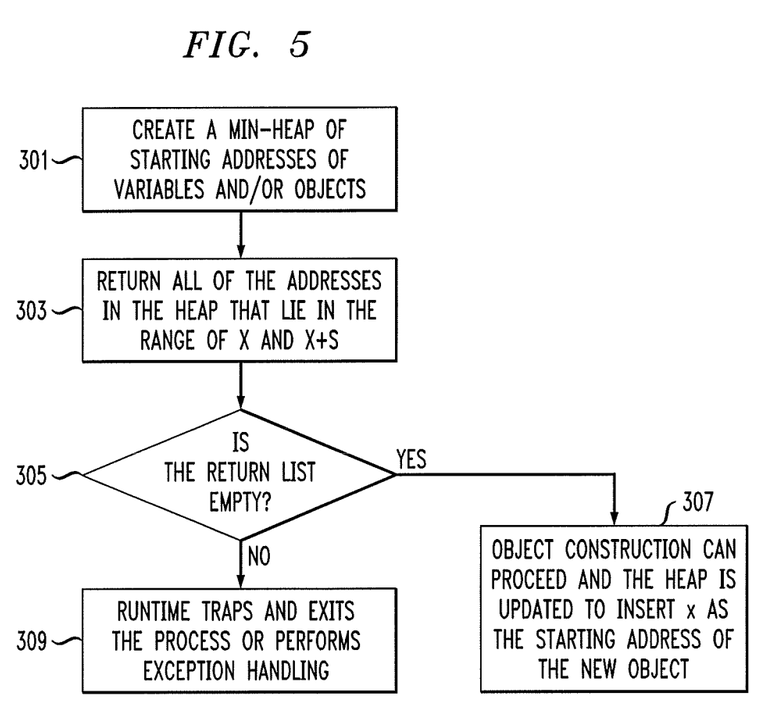
FIG. 5 is a flow diagram which shows details of the method at block 205 of FIG. 4 according to an exemplary embodiment of the invention.

Referring to FIG. 5, which shows details of the method at block 205, the compiler 103 creates a MN-HEAP of starting addresses of variables and/or objects (block 301). As an alternative to a MIN-HEAP, the starting addresses can be in, for example, list form, or another form for presenting data. At block 303, given an address X (e.g., 0000) where the object is to be placed and a size S of the object to be created by the placement new construct (e.g., 0024), the MIN-HEAP returns all of the addresses in the HEAP that lie in the range of X and X+S. All of the variables having a starting address between X and X+S will be overwritten by an object having a size S, thereby creating an overflow problem. Therefore, at block 305, the process queries whether the return list from block 303 is empty. If the return list is empty, then object construction can proceed since there are no variables that will be overwritten, and the HEAP is updated to insert x as the starting address of the new object (block 307). If, however, the return list is not empty, it is concluded that object construction cannot proceed, and the runtime 107 traps and exits the process (block 309). Further, according to an embodiment, as an alternative to termination, the runtime throws an exception that the operating system or another system can handle for fault tolerance and/or auditing.

Figure 6:
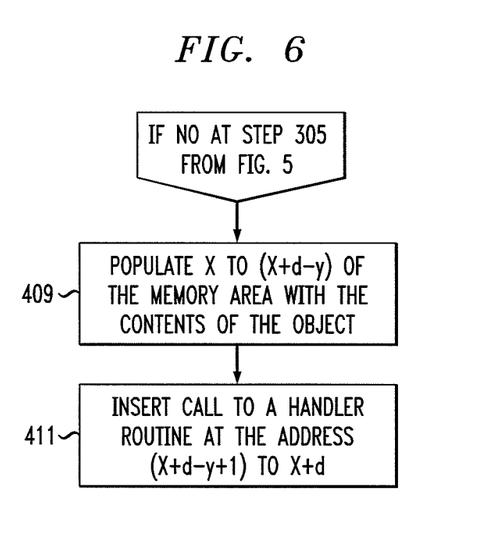
FIG. 6 is a flow diagram which shows details of the method at block 207 of FIG. 4 according to an exemplary embodiment of the invention.

Referring to FIG. 6, which shows details of the method at block 207 in FIG. 4, the method follows the method in FIG. 5 up to block 307. However, unlike FIG. 5, the method of FIG. 6 does not terminate or perform exception handling at the next step if the return list is not empty, and instead takes into consideration that a given execution might not reach all the parts of an object, allowing for the possibility that the object can be trimmed to prevent overflow, and the execution can proceed and succeed. In other words, there are some instances where a given program still can proceed when data is overwritten because the program does not use the data that has been overwritten. According to an embodiment, if the return list is not empty at block 305, object construction proceeds at block 409 by populating a portion of the memory area with less than the total object, and populating the remaining space with a handler routine (block 411). For example, if X to X+d is the memory space that has been allocated to a single object (e.g., 0 to 24), and the instruction for invoking the handler requires y bytes (e.g., 4 bytes), X to (X+d−y) (e.g., 0 to 20) of the memory area is populated with the contents of the object. Then at block 411, the call to a handler routine is inserted at the address (X+d−y+1) to X+d (e.g., 21 to 24). If the execution of a program reaches (X+d−y+1) to X+d, then the handler routine is triggered to address potential problems that may be associated with data in the memory area that might need to be accessed. According to embodiments of the present invention, while providing an option to trap and exit the process, the handler routine can also provide options for carrying out exception handling, bookkeeping tasks and/or fault tolerance. For example, as an alternative to trapping and exiting the process, the handler routine may start a new program, remove data that the program has created and/or send a crash report or message that there are potential issues with the execution of the program, requiring user input.

Figure 7:
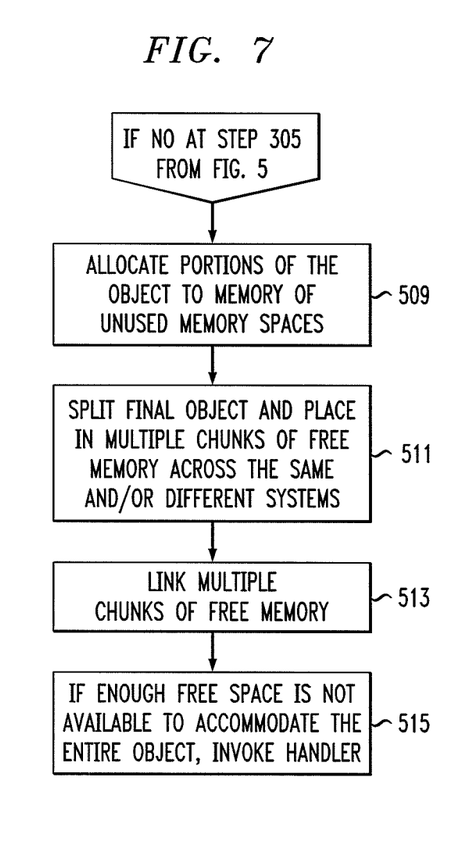
FIG. 7 is a flow diagram which shows details of the method at block 209 of FIG. 4 according to an exemplary embodiment of the invention.

Referring to FIG. 7, which shows details of the method at block 209, the method follows the method in FIG. 5 up to block 307. However, unlike FIG. 5, if the return list is not empty at block 305, portions of the object, including the portions that would overwrite data (e.g., bonusid in FIGS. 1 and 2) are allocated to memory of unused memory spaces (block 509). In this case, as described above, the final object is split and is placed in multiple chunks of free memory across the same and/or different systems (block 511), wherein the multiple chunks of free memory are linked together (block 513). According to an embodiment, as an additional step, if enough free space is not available to accommodate the entire object, a handler routine can be invoked which waits for more memory, and/or re-uses memory of lower priority processes (e.g., processes that can fail or wait) (block 515).

Figure 8:
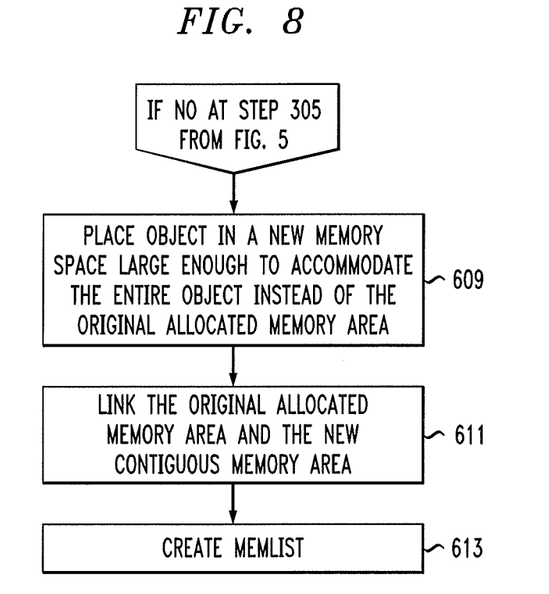
FIG. 8 is a flow diagram which shows details of the method at block 211 of FIG. 4 according to an exemplary embodiment of the invention.

Referring to FIG. 8, which shows details of the method at block 211, the method follows the method in FIG. 5 up to block 307. However, unlike FIG. 5, if the return list is not empty at block 305, a memory space large enough to accommodate the entire object is used instead of the original allocated memory area (block 609). The newly allocated memory area is contiguous and large enough to accommodate an entire object without splitting the object. According to an embodiment, there is a link between the original allocated memory area and the new contiguous memory area (e.g., between address 64 and a new address 128) (block 611). According to an embodiment, a list of addresses, referred to a "memlist" is created which lists the original allocated memory address (e.g., 64) in, for example, a first column, and the corresponding new address (e.g., 128) in, for example, a second column (block 613). In this manner, when a program refers to the original address, the memlist returns the actual new address so that the object can be accessed. According to embodiments, the layout of the memlist can be varied as long as the memlist performs the function of linking the original allocated address with the new location. As an alternative to following the method in FIG. 5 up to block 307, depending on the constraints and/or policies of the program, objects being placed with placement new constructs may automatically be assigned to new memory locations as per block 211 regardless of whether there is a detected overflow problem.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 2-8 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 9:
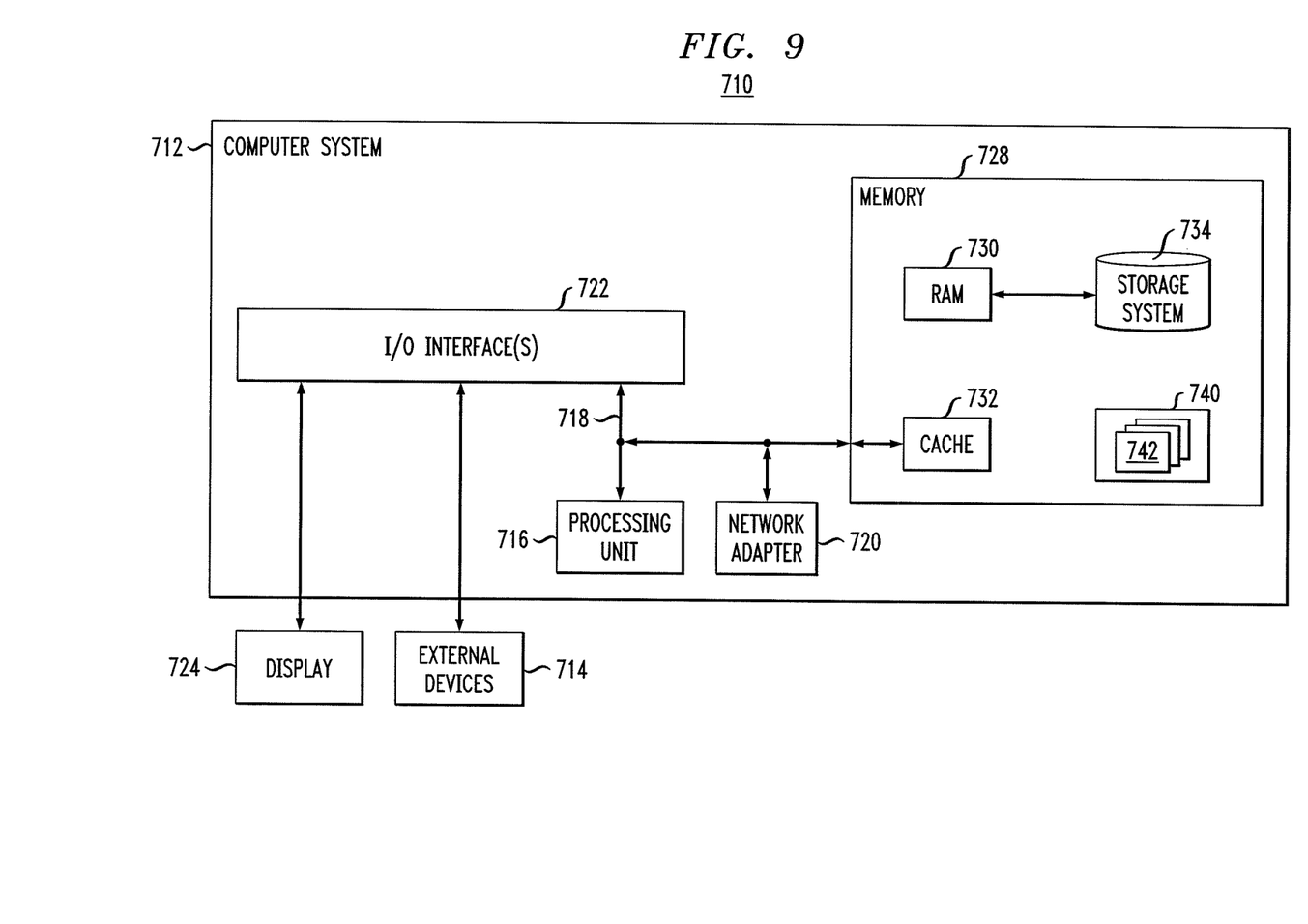
FIG. 9 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 9, in a computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 712 in computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

The bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 712 typically includes a variety of computer system readable media. Such media may be any available media that is accessible by computer system/server 712, and it includes both volatile and non-volatile media, removable and non-removable media.

The system memory 728 can include computer system readable media in the form of volatile memory, such as random access memory (RAM) 730 and/or cache memory 732. The computer system/server 712 may further include other removable/non-removable, volatile/nonvolatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 718 by one or more data media interfaces. As depicted and described herein, the memory 728 may include at least one program product having a set (e.g., at least one) of program modules that are configured to carry out the functions of embodiments of the invention. A program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc., one or more devices that enable a user to interact with computer system/server 712, and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method for protecting from buffer overflow vulnerability due to placement new constructs, the method comprising:
   detecting whether there is an instruction in a program which would lead to buffer overflow;
   checking whether the instruction is a placement new instruction which would result in an object overwriting contents in a memory area;
   selecting a method for preventing the buffer overflow if the instruction is the placement new instruction which would result in the object overwriting the contents in the memory area, wherein the selected method prevents the buffer overflow from occurring by controlling an allocation of the object to permit placement of the object in one or more memory regions;
   wherein the selection of the method is based on at least one predetermined policy;
   wherein the selected method is selected from at least a first method and a second method;
   wherein the first method takes into consideration that a given execution of the program will not reach all parts of the object and comprises populating a portion of the memory area allocated by the placement new instruction with less than a total of the object;
   wherein the second method comprises allocating portions of the object to respective memory regions, wherein the respective memory regions are in different systems; and
   wherein the predetermined policy dictates one or more operations to be performed on the object in order to prevent the buffer overflow from occurring, the one or more operations comprising:
   the populating the portion of the memory area allocated by the placement new instruction with less than the total of the object;
   the allocating of the portions of the object to the respective memory regions in the different systems;
   allocating the object to a memory location other than a memory location allocated by the placement new instruction and that is large enough to accommodate the object in its entirety; and
   allocating respective portions of the object to free memory of unused memory spaces by dividing the object into the respective portions, and placing the respective portions in a plurality of blocks of the free memory, wherein the blocks of free memory are linked together.

2. The method according to claim 1, wherein the policy is based on at least one of a type of the program, and a purpose of the program.

3. The method according to claim 1, wherein the policy is based on at least one of a timeframe and where the program is run.

4. The method according to claim 1, wherein the policy is based on at least one of availability of memory, and a requirement to use already allocated memory.

5. The method according to claim 1, wherein the policy is supplied during runtime and is independent of the program.

6. The method according to claim 1, wherein the policy is supplied with the program, as part of the program.

7. The method of claim 1, wherein the checking comprises determining whether a size of the object taken from a memory address allocated by the placement new instruction goes beyond a point in the memory area where the contents are located.

8. The method of claim 1, wherein the selected method is further selected from at least a third method, wherein the third method comprises one of terminating the program or performing exception handling.

9. The method of claim 1, further comprising:
   creating a data form including starting addresses of the contents in the memory area; and
   given an address X where the object is to be placed and a size S of the object created by the placement new instruction, returning all of the starting addresses in the data form that lie in the range of X and X+S.

10. The method of claim 9, wherein the selected method is further selected from at least a third method, wherein the third method comprises one of terminating the program or performing exception handling if the return list is not empty.

11. The method of claim 9, further comprising selecting the first method if the return list is not empty, wherein the first method further comprises populating a remaining space of the memory area originally allocated to a remaining portion of the total of the object with a handler routine.

12. The method of claim 9, wherein the allocating the respective portions of the object to the free memory is performed if the return list is not empty.

13. The method of claim 9, wherein:
   the allocating the object to the memory location other than the memory location allocated by the placement new instruction is performed if the return list is not empty; and
   the method further comprises storing a correspondence between the memory location allocated by the placement new instruction and the other memory location.

14. A method for protecting from buffer overflow vulnerability due to placement new constructs, the method comprising:
   determining whether an instruction in a program is a placement new instruction which would result in an overflow into memory regions and overwrite contents in memory that are expected not to be overwritten in a correct program; and carrying out a policy to be instituted if it is determined that the instruction is the placement new instruction which would result in the overflow, wherein the policy requires that action be taken to prevent the overwriting by controlling an allocation of an object to permit placement of the object in one or more memory regions;

wherein the selection of the action taken to prevent the overwriting is based on the policy;

wherein the action taken to prevent the overwriting is selected from at least first and second methods;

wherein the first method takes into consideration that a given execution of the program will not reach all parts of the object and comprises populating a portion of a memory region allocated by the placement new instruction with less than a total of the object;

wherein the second method comprises allocating portions of the object to respective memory regions, wherein the respective memory regions are in different systems; and wherein the predetermined policy dictates one or more operations to be performed on the object in order to prevent the buffer overflow from occurring, the one or more operations comprising:

the populating the portion of the memory area allocated by the placement new instruction with less than the total of the object;

the allocating of the portions of the object to the respective memory regions in the different systems;

allocating the object to a memory location other than a memory location allocated by the placement new instruction and that is large enough to accommodate the object in its entirety; and allocating respective portions of the object to free memory of unused memory spaces by dividing the object into the respective portions, and placing the respective portions in a plurality of blocks of the free memory, wherein the blocks of free memory are linked together.

15. The method according to claim 14, wherein the policy is based on at least one of a type of the program, and a purpose of the program.

16. The method according to claim 14, wherein the policy is based on at least one of availability of memory, and a requirement to use already allocated memory.

17. The method according to claim 14, wherein the policy is based on at least one of a timeframe and where the program is run.

18. The method according to claim 14, wherein the policy is supplied during runtime and is independent of the program.

19. The method according to claim 14, wherein the policy is supplied with the program, as part of the program.

\* \* \* \* \*